Patented Nov. 1, 1932

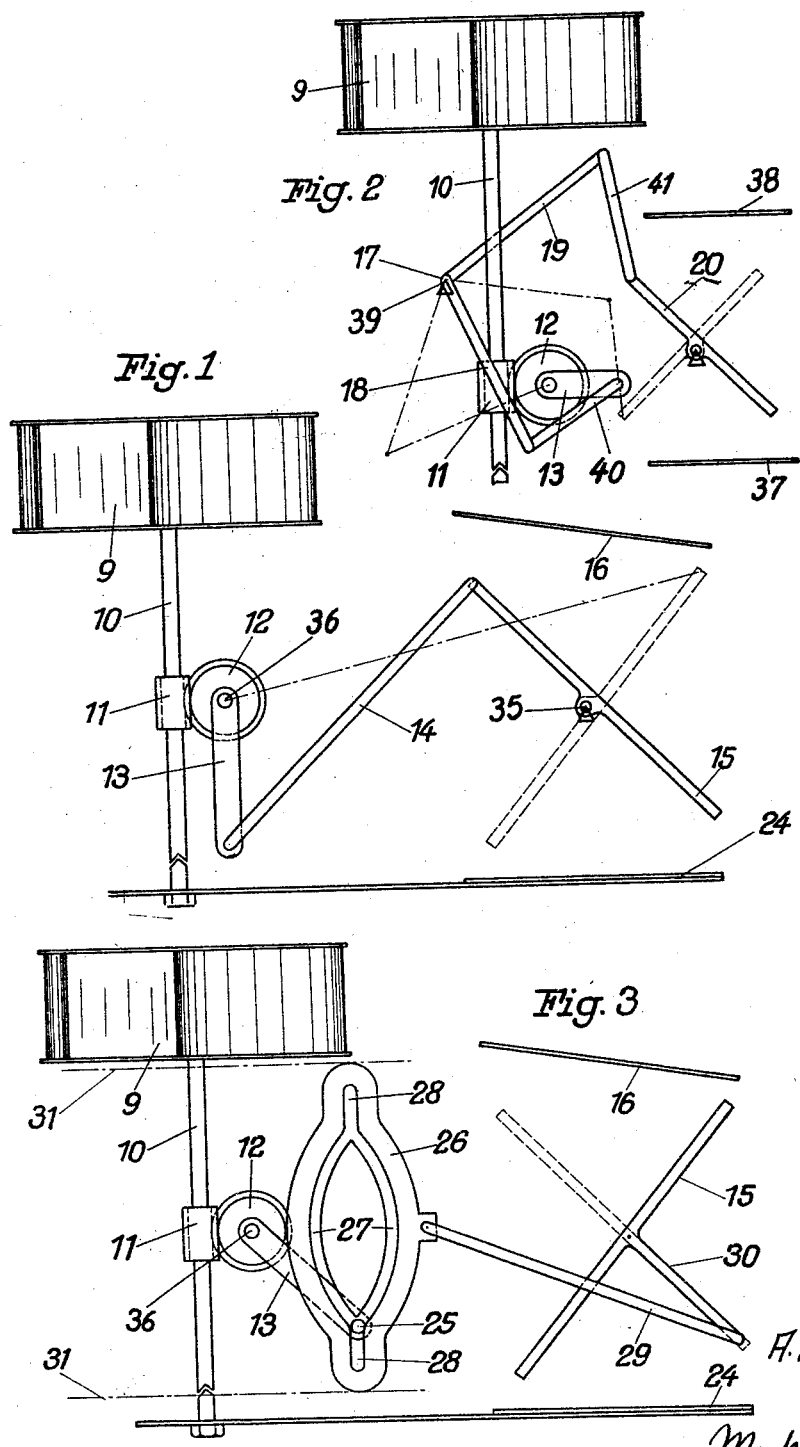

1,885,595

UNITED STATES PATENT OFFICE

ALEXANDER EHRENZWEIG, OF ZURICH, SWITZERLAND

DISPLAY APPARATUS

Application filed August 12, 1931, Serial No. 556,693, and in Germany August 14, 1930.

My invention relates to improvements in display apparatus, and more particularly in display apparatus of the type comprising a rotary displaying member adapted successively to display signs, which member is driven from a continuously rotating shaft, for example the shaft of a wind wheel. The object of the improvements is to provide an apparatus of this type by means of which the signs are displayed by the said member so that they can be more readily observed, and with this object in view my invention consists in providing gearing intermediate the continuously rotating shaft and the displaying member by means of which the continuous rotary movement of the shaft is transformed into oscillating movement of the member, the said member being in displaying position at the end of each oscillating movement.

For the purpose of explaining the invention several examples embodying the same have been shown in the accompanying drawing in which the same reference characters have been used in all the views to indicate corresponding parts. In said drawing, Fig. 1 is a diagrammatical elevation showing a display apparatus in which a crank mechanism is provided between the rotating shaft and the displaying member, Fig. 2 is a similar diagrammatical elevation showing a modification in which in addition to the crank mechanism a bell crank lever is provided intermediate the said parts, and Fig. 3 is a similar diagrammatical elevation comprising in combination with the crank mechanism a cam controlling the transmission of the movement from the rotating shaft to the displaying member.

In the example shown in Fig. 1, the display apparatus comprises a mirror 15 mounted for oscillating on bearings 35, a plate 16 located above the mirror, and a plate 24 located below the same. The said plates 16 and 24 are provided with the signs to be displayed by the mirror 15. The upper plate 16 may be made from transparent material having the signs made thereon, or it may be made from opaque material having transparent portions forming the sign to be displayed, the sign being illuminated by daylight passing through the plate 16. The plate 24 may be made from opaque material, and it has the sign produced thereon in bright colors, the sign being illuminated by light falling on the sign from the right of the apparatus.

In the operation of the apparatus the persons inspecting the sign are understood to stand at the right in Fig. 1, and in the position of the mirror 15 shown in full lines the light passing through the plate 16 falls on the top face of the mirror 15, the said mirror reflecting the light to the right and towards the person inspecting the sign. In the position of the mirror 15 shown in dotted lines the reflecting surface of the mirror is directed downwardly, so that it is adapted to reflect the rays emanating from the illuminated sign on the plate 24.

For moving the mirror 15 a rotary shaft 10 is provided which as shown carries a wind wheel adapted to be rotated by natural currents of air or, for example on a vehicle, by the draft produced by the moving vehicle. The shaft 10 carries a worm 11 which is in mesh with a worm gearing 12 the shaft 36 of which is connected with a crank arm 13. The said crank arm is connected by a link 14 with one end of the mirror 15.

In the operation of the apparatus the continuous movement of the shaft 10 is transformed by the crank mechanism 13, 14 into oscillating movement of the mirror 15. In the position shown in full lines the said mirror is in position for displaying the signs made on the upper transparent sign 16, and the crank arm 13 is near its left hand dead center so that the mirror slowly moves through its displaying position. In the position shown in dotted lines the mirror displays the sign made on the plate 24. As shown, the crank 13 just passes through its right hand dead center so that the mirror is substantially at rest while it is in displaying position.

In Fig. 2 I have shown a modification in which the signs are provided on the oscillating member 20 and at opposite sides thereof. In the position shown in full lines the upper surface carrying signs is illuminated from above, and the said signs may be inspected from the right of Fig. 2, and in the position shown in dotted lines the opposite side of the plate 20 is directed downwardly and towards the right, so that the signs made on the bottom side of the plate 20 may be inspected. The said signs are illuminated from below, for example by the plate 37, which may be painted in bright colors or which may have a reflecting surface.

I wish it to be understood that also in the construction shown in Fig. 2 the surface 37 and the upper surface 38 may be provided with the signs to be displayed, in which case the plate 20 is provided at both sides with reflecting surfaces.

The oscillating movement is imparted to the plate 20 by means of the wind wheel 9 and the shaft 10 thereof through the intermediary of the worm gearing 11, 12. The crank arm 13 is not directly connected with the plate 20 by a link, as has been described with reference to Fig. 1, but through the intermediary of a bell crank lever 18, 19 mounted in relative fixed bearings 39, the arm 18 of the bell crank lever being connected by a link 40 with the crank arm 13, and the arm 19 being connected by a link 41 with the plate 20.

The figure shows the displaying positions of the plate 20 respectively in full lines and in broken lines, and also the gearing has been shown respectively in full lines and in broken lines indicating the positions corresponding to the second displaying positions of the mirror 20. It will be seen that in the position shown in full lines the crank arm is close to one of its dead centers, and that in the position shown in broken lines it just passes through its other dead center, so that in both displaying positions the plate 20 has a very small oscillating movement.

In Fig. 3 I have shown another modification in which a transmission member is interposed between the continuously moving crank mechanism and the displaying device for holding the displaying device in both displaying postions for a considerable length of time. The construction of the disk 15 may be the same as has been described with reference to Fig. 2, and it may carry signs at both sides, or it may have reflecting surfaces at both sides. The driving mechanism and the crank mechanism thereof are similar in construction to the corresponding parts shown in Figs. 1 and 2 and the same letters of reference have been used to indicate corresponding parts.

On a pair of guide ways 31, 31 a member 26 is slidingly supported, which is adapted to perform reciprocating movement on the said guide ways. The member 26 is formed with a cam groove providing two circular portions 27 and rectilinear portions 28 disposed at opposite ends of the circular portions 27. The cam groove 27, 28 is engaged by a pin 25, carried by the crank arm 23, and the member 26 is connected by a link 29 with an arm 30 secured to the plate 15.

In the operation of the apparatus the pin 25 of the crank arm 23 moves through the cam groove 27, 28. In the position shown in Fig. 3 the said pin is about to move through the right hand portion of the cam groove 27, the said cam groove being concentric to the shaft 36. Therefore, for the present no movement is imparted to the plate 15, so that the design may be regarded with ease. After the pin 25 has passed through the said portion of the cam groove it engages the rectilinear portion 28 provided at the top of the member 26, and thereby the said member is shifted to the left and to the opposite side of the shaft 36. This movement is transmitted by the link 29 to the plate 15 which therefore is oscillated into the position shown in broken lines in which its opposite face is in displaying position. Thereafter the pin 25 moves through the left hand branch of the cam groove 27 which now is concentric to the shaft 12. Therefore the disk 15 remains for a considerable length of time at rest and in displaying position. After the pin 25 has moved through the cam groove 27 it engages in the rectilinear part 28 provided at the bottom part of the member 26, whereby the member 26 is moved to the right and the disk 30 is returned into initial position.

The angle of the arc-shaped cam groove 27 is substantially 90°, so that the signs are at rest each during one fourth of the rotary movement of the crank arm 13.

The display apparatus may be used for various purposes, particularly for advertising purposes. It will be understood that the invention is not limited to the construction shown in the figures in which a single displaying member 15, 20 is provided, so that a plurality of mirrors or the like may be provided in connection with the wind wheel.

I claim:

1. The herein described apparatus, comprising a displaying mirror having oscillating movement from one displaying position into another one, a driving member having continuous rotary movement, and gearing intermediate said driving member and displaying mirror for transforming the continuous rotary movement of said driving member into oscillating movement of said displaying mirror, and display signs arranged to co-operate with said mirror in the respective displaying positions of the mirror.

2. The herein described apparatus, comprising a displaying mirror having oscillating movement from one displaying position into another one, a wind wheel having continuous rotary movement, and gearing intermediate said wind wheel and displaying mirror for transforming the continuous rotary movement of said wind wheel into oscillating movement of said displaying mirror, and display signs arranged to co-operate with said mirror in the respective displaying positions of the mirror.

3. The herein described apparatus, comprising a displaying mirror having oscillating movement from one displaying position into another one, a driving member having continuous rotary movement, and crank mechanism intermediate said driving member and displaying mirror for transforming the continuous rotary movement of said driving member into oscillating movement of said displaying mirror, the connection and relative position of said crank mechanism and oscillating member being such that when the oscillating member is in displaying position the crank of the said crank mechanism is near a dead center, and display signs arranged to co-operate with said mirror in the respective displaying positions of the mirror.

4. The herein described apparatus, comprising a displaying mirror having oscillating movement from one displaying position into another one, a driving member having continuous rotary movement, and gearing intermediate said driving member and displaying mirror for transforming rotary movement of said driving member into oscillating movement of said displaying mirror, said gearing comprising crank mechanism and a bell crank lever intermediate said crank mechanism and displaying mirror, and said gearing being positioned so that the crank arm of said crank mechanism is near its dead centers when the said displaying member is in displaying positions, and display signs arranged to co-operate with said mirror in the respective displaying positions of the mirror.

5. The herein described apparatus, comprising a displaying member having oscillating movement from one displaying position into another one, a driving member having continuous rotary movement, and gearing intermediate said driving member and displaying member adapted to transform rotary movement of said driving member into oscillating movement of said displaying member, said gearing comprising crank mechanism and a cam groove having its cam face engaged by the crank arm of said crank mechanism and connected with said displaying member.

6. The herein described apparatus, comprising a displaying member having oscillating movement from one displaying position into another one, a driving member having continuous rotary movement, and gearing intermediate said driving member and displaying member adapted to transform rotary movement of said driving member into oscillating movement of said displaying member, said gearing comprising crank mechanism and a cam groove having its cam face engaged by the crank arm of said crank mechanism and connected with said displaying member, said cam groove having cam faces adapted to be engaged by said crank arm and disposed in certain positions of the cam groove concentrically of the axis of said crank mechanism.

In testimony whereof I hereunto affix my signature.

ALEXANDER EHRENZWEIG.